April 13, 1943.  M. D. WOODRUFF  2,316,208
ROASTER SYSTEM
Filed March 21, 1939  2 Sheets-Sheet 1

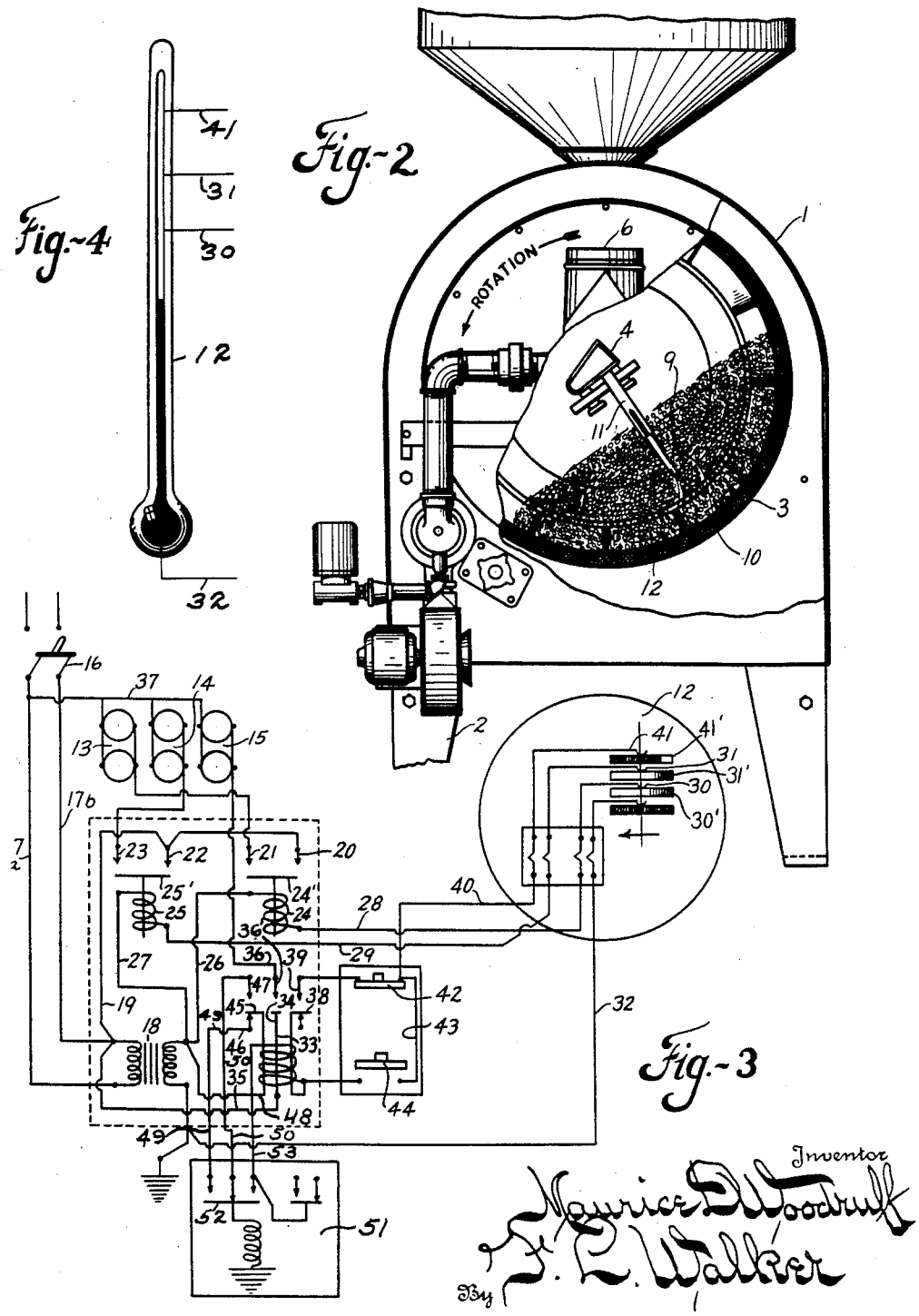

Patented Apr. 13, 1943

2,316,208

UNITED STATES PATENT OFFICE 2,316,208

ROASTER SYSTEM

Maurice D. Woodruff, Springfield, Ohio, assignor to The Bauer Brothers Company, Springfield, Ohio, a corporation of Ohio Application March 21, 1939, Serial No. 263,261

10 Claims. (Cl. 263—32)

This invention primarily pertains to a batch roaster for peanuts, coffee, cereals, and analogous products, and more particularly to an automatic thermally responsive regulatory and signal system and method of operation for control of color and flavor of the treated materials. The invention is capable, however, of being readily adapted for industrial purposes for heat treatment of small manufactured parts, or for other analogous operations.

For illustrative purpose, but without intention of unduly limiting the scope or application of the invention, it is herein described in its relation to treatment of peanuts for commercial manufacture of peanut butter. The retail trade is quite critical of the color and taste of peanut butter, and requires that the product made from time to time shall be of uniform shade and flavor. The particular shade of color of the roasted peanuts and the flavor of butter manufactured therefrom are directly dependent upon the roasting conditions and the extent to which the roasting operation is continued.

Heretofore, the batch method of roasting peanuts has necessitated expert supervision of a skilled operator who knows from experience approximately the required time for properly roasting the nuts under different conditions. It is the practice, however, for such expert operator to take frequent samples for examination as to color as the roasting operation approaches completion. Being a matter of personal judgment, good eyesight and keen appreciation of color values, much difficulty has been experienced in maintaining uniform color and flavor of successive batches. Even under careful observation, occasional batches are ruined by the best operators through too little or too long roasting. Too long roasting of the nuts gives to the butter made therefrom a dark, unpleasing color and a strong flavor of being slightly burned. To the contrary, too little roasting will fail to develop either the color or flavor. The butter therefrom will possess a disagreeable raw taste and pale color. The roasting time is quite critical. Frequently, a time variation of as little as thirty seconds will effect a pronounced difference of color and flavor.

There are several variable factors which affect such batch roasting and determine the time period for proper roasting. The temperature of the nuts entering the roaster may vary as much as thirty (30) degrees or more from a storage temperature of approximately 90° F. in summer to 60° F. in winter, which therefore necessitates greater or less warming time. Likewise, a difference of one degree of moisture content of the nuts when entering the roaster may necessitate a difference of thirty (30) seconds in the roasting period, which, as stated, may be sufficient to spoil the entire batch for commercial butter making. Other variables which affect the roasting period and finished result, and therefore to be considered, are fluctuations of fuel gas pressure and resulting variation of roasting temperature, variation of air drafts to which the roaster is subjected and resulting heat radiation, and fluctuating effects of chimney drafts on the interior of the roaster. Furthermore, the quantity of nuts contained in a batch is an important factor in determining the roasting time period. Fifteen pounds difference in a batch of three hundred seventy-five (375) pounds as compared with a batch of three hundred sixty (360) pounds will ordinarily cause a difference of thirty (30) seconds in the required roasting time. Also, the relative proportions of mixture of nuts of different character or grade, as of Spanish and Virginia nuts, will also directly affect the roasting time. It is, therefore, highly important that the roasting period be accurately determined and controlled as to time and temperature, much more closely than the human factor will permit. It has been found that color is directly dependent upon temperature. It has been found that a final temperature of approximately 275 degrees Fahrenheit produces a color most acceptable to the trade. Numerous attempts have been made to control the result by taking temperature within the roasting cylinder, but merely taking the air temperature within the cylinder is not reliable. The roasting operation is sufficiently critical that the actual temperature of the nuts themselves is the important factor. Also, to take the temperature in a more or less rapidly moving portion of the mass is not sufficiently accurate, and the introduction of a thermometer or other thermal responsive device will interrupt the flow of nuts and cause the formation of an air pocket, the temperature of which will be registered and thus give a false reading.

To insure uniform roasting and maintenance of established standards of color and flavor of the finished product, the present invention includes the herein described method of utilizing the temperature reaction from a zone of minimum disturbance in the mass where the material conforms closely to the thermometer bulb or responsive portion of the thermal element, which temperature response is utilized to indicate the progress of the roasting operation and control the heat supply or perform other steps in the operation.

The object of the present invention is to provide a roasting apparatus of the character described, which may not only be economically manufactured, but will be highly efficient in use, uniform in operation, automatic in action, and unlikely to get out of repair.

A further object of the invention is to provide means for accurately gauging the roasting period while automatically compensating for varying controlling factors.

A further object of the invention is to provide a method of accurate temperature determination of a mass of roasting nuts or other material.

A further object is to provide an improved temperature controlled signal system for automatically indicating the progress of the roasting operation.

A further object of the invention is to enable the mounting of a control thermometer in such relation to the mass of roasting material as to afford accurate readings, unaffected by air pockets in the mass or irregular distribution of the material.

A further object of the invention is to provide safety means to protect against accidental overheating of the roaster.

A primary object of the invention is to provide an apparatus and method of operation which will relieve the operator of the necessity for exercise of expert judgment and which will enable automatic, substantially fool-proof control of the operations and thereby insure uniformity of the product.

With the above primary and other incidental objects in view as will more fully appear in the specification, the invention consists of the features of construction, the parts and combinations thereof, and the mode of operation, or their equivalents as hereinafter described and set forth in the claims.

In the drawings, wherein is shown the preferred, but obviously not necessarily the only form of embodiment of the invention, Fig. 1 is a side elevation partly broken away of an assembled roasting apparatus showing placement of the thermally responsive element.

Fig. 2 is an end elevation thereof, also partly broken away to illustrate the relation of the control thermometer bulb with the mass of material being operated upon.

Fig. 3 is an electrical diagram of the signal control system and automatic protective means.

Fig. 4 is a detail view of a thermo-electric regulator wherein an enclosed column of mercury closes a series of contacts successively.

Like parts are indicated by similar characters of reference throughout the several views.

Figure 1:
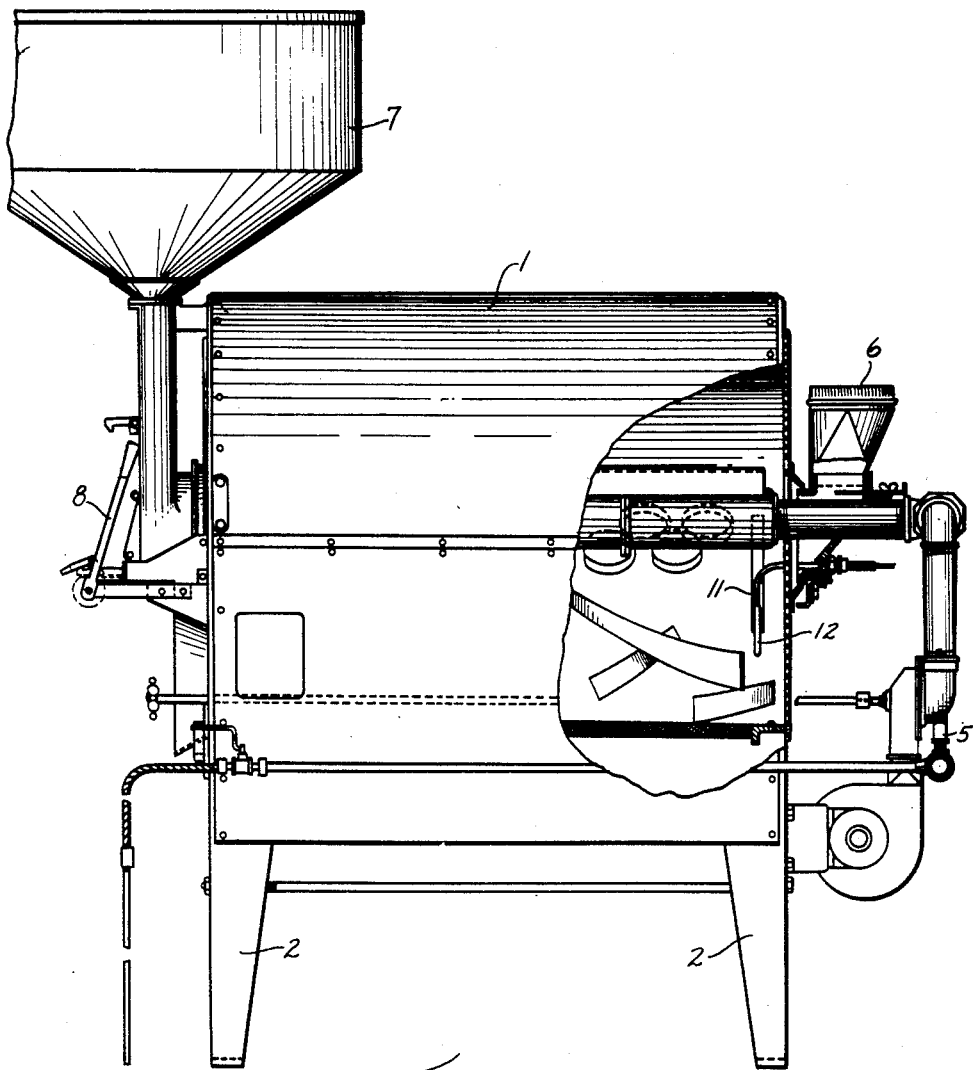

While, as before mentioned, the present apparatus and method is especially adapted for peanut roasting, it is to be understood that it is not limited thereto, but is applicable to conditioning of other materials including coffee, cereals and the like, and also for heat treatment of manufactured articles.

In the drawings there is shown a roaster wherein a suitable retort or housing 1 supported on legs 2 encloses a rotary drum 3 mounted therein for rotation about a horizontal axis. The rotary drum 3 is heated by a suitable burner, either exteriorly or interiorly of the drum. The preferable heater means comprises gas burners 4 of the radiant type, substantially axially disposed interiorly of the drum and supplied with fuel gas through the air-gas mixer conduit 5. Fumes, vapors and volatile substances released from the material during roasting are drawn from the drum through a flue 6, communicating with the interior of the drum and surrounding the fuel supply conduit 5.

The nuts, or other material operated upon, are supplied to the drum from an elevated funnel shaped hopper 7, having at its lower end a manually operated cut-off slide or gate controlled by the hand lever 8. Interiorly the rotary drum 3 is provided with a double series of reversely arranged helically disposed vanes, which as the drum rotates tend to divert the nuts first in one direction and then in the other to insure thorough and uniform agitation and distribution of the nuts in the drum. By rotation of the drum, the nuts are carried upwardly until the mass of nuts 9 assumes an oblique position progressively projected beyond the angle of repose whereby the uppermost nuts continue to descend by gravity to the lower margin of the mass. As shown by the series of arrows in Fig. 2 of the drawings, the nuts progressively traverse a circuitous path in which they ascend through an arcuate path contiguous to the circumferential wall of the drum and descend through an inclined straight path along the chord of their arcuate ascending path.

The nuts interiorly of the mass move less rapidly in concentric paths of ever decreasing extent. Due to the reversely inclined deflector vanes, the nuts are continuously diverted from one course to another, the inner nuts of the mass being deflected outwardly and the exterior nuts are directed inwardly. There is, however, at the center or vortex of the mass substantially concentric with the paths of travel of the nuts, a zone 10 of comparative quiet or minimum disturbance. While no nuts come permanently to rest in such zone, there is not such flow as would be likely to form air pockets, and the temperature in the vortex zone is fairly indicative of the temperature of the entire mass.

Therefore, this vortex of the circulating mass of nuts has been adopted for present temperature control purposes. Supported upon and projecting radially from the axially disposed heater means is a thermal element support and guard 11, which extends into the mass of nuts and carries at the critical point, to wit, the vortex of the mass, a thermally responsive element 12. In the drawings this is shown as a thermo-electric device comprising a high temperature thermometer having electrical contacts closed by the thermal fluid at predetermined temperatures for control of a signal and regulatory system. However, it is to be understood that various forms of thermally responsive means may be employed, as for example, a Peltier thermo-couple, or a thermostat, or other thermo-electric means for energizing an electric circuit when a predetermined temperature has been attained.

Even though no electrical control or signal apparatus is employed, the means and method hereinbefore described is quite desirable for taking accurate temperature readings of the mass of material during progress of the operations. It has been found that temperature readings taken within the drum in the air above the mass of nuts are quite unreliable, and will not enable the close and accurate control of temperature found essential to proper commercial conditioning of the material. Likewise, it is found that if the reading is taken at a higher point in the mass where the nuts are moving more rapidly down their inclined path, the obstruction afforded by the instrument and its mounting which tend to cause the nuts to pile up on one side and form an air pocket at the lower side thereof, also gives a false temperature indication. It is therefore found that while the nuts circulate about the thermal instrument when positioned at the vortex of the mass, they do so quite evenly without formation of air pockets, and that the circulation and agitation of the nuts in the mass is sufficient that the temperature of those nuts at the center or vortex of the mass is uniform with those elsewhere in the mass, and that quite accurate determination of temperature of the mass is enabled.

The fluctuation of temperature, as determined by a thermo-electric instrument 12, may be utilized to control remote signal and regulating means of any desired character. For illustrative purposes, there is diagrammatically shown in Fig. 3 an electrical system wherein the fluctuation of the thermo-electric instrument serves to operate different signals to indicate, first that fuel supply valve is open and the heater means in operation, second a warning that the roasting operation is approaching completion and a final signal when the operation is fully completed. In addition thereto, the same thermo-electric instrument and electrical system serves to automatically shut off the fuel supply in event the oven becomes overheated. Obviously, other signal and regulatory devices may be included in the system, under control of the same thermally responsive instrument.

Referring to the electrical diagram Fig. 3, the several signal devices which may be lights or bells, are preferably provided in multiple, one set being contiguous to the roaster apparatus and another at some remote supervisory station. The warning signal, final signal, and heater signal are shown at 13, 14 and 15 respectively. The thermo-electric instrument is schematically indicated at 12. The signals are supplied with current at full voltage, while the several electrically operated switches therefor are actuated by reduced voltage supplied by a suitable transformer in the system.

Current is supplied from the service lines through the switch 16 and lines 17a and 17b leading to the primary side of the transformer 18. A continuing line 19 leads from the line 17b to a pair of contacts 20 and 22, which are electrically connected with complementary contacts 21 and 23 pertaining respectively to the warning signals 13 and final signals 14, by electrically operated circuit closers 24 and 25. The circuit closers are illustrated as of the solenoid type, energized through lines 26 and 27 respectively from the secondary side of the transformer 18. The electric switches 24 and 25 are connected through the continuing lines 28 and 29 with differently positioned contacts 30 and 31 of the thermo-electric control instrument 12 and automatically closed at different temperatures. The thermo-electric control instrument 12 is in turn connected by a common return line 32 with the opposite terminal of the transformer secondary winding, thereby completing the circuit.

In addition to the electrically operated circuit closers 24 and 25, there is provided a multiple switch 33, one contact 34 of which is connected through the line 35 with the current supply line 17b. Such contact 34 cooperates with a complementary contact 36' to close the circuit through the line 36 to the heater signal 15. The several signals 13, 14 and 15 are connected through a common line 37 with the supply line 17a, thereby completing the several circuits therethrough when the respective circuit closers are actuated.

In addition to the pole 34, the switch 33 has a contact pole 38 connected in series with the winding of the switch 33, which on operation of the switch closes with a contact 39 connected through a line 40 with a thermally closed contact 41 of the thermally responsive instrument 12 which, as before stated, is connected through the common return line 32 with the opposite side of the transformer secondary winding. The line 40 has therein a normally closed stop button contact 42 to be manually opened. Connected around this normally closed stop button contact 42 is a shunt 43, in which is a normally open manually operable start contact button 44. Opening the stop button 42 deenergizes the operator coil of the switch 33 and thereby allows the contact 38—39 to open. Such switch coil will remain deenergized until the start button 44 is momentarily closed to energize the coil of the switch 33, whereby the contacts 38—39 are again closed to reestablish the circuit through the switch coil by which they are then held in closed relation. The same switch is further provided with a third pole 45, which when the switch coil is deenergized, closes with a contact 46, and when the switch coil is energized, the pole 45 breaks its contact with the contact 46 and makes contact with a second complementary contact 47.

The switch pole 45 is connected through the line 48 with the secondary side of the transformer 18. In either position of the switch the contact pole 45 supplies current through alternately the line 49 or the line 50 to the motor unit 51, indicated only diagrammatically in Fig. 3. A switch 52 associated with the motor 51 serves to open and close the circuit through the line 53 to the winding of the multiple switch 33, the opposite side of which is connected through the line 40 and return line 32 to the opposite side of the transformer 18 secondary.

It has been found in practice that the operator can not read the dial of the thermometer with sufficient accuracy to obtain perfect control of the color. To obtain best results the thermometer is connected through an electrical system which is capable of making a signal when the temperature of the material has reached a predetermined point. It has also been found advisable to provide a warning signal about 90 seconds before the final signal so that the operator will be ready to discharge the roaster when the final signal occurs.

Briefly stated, the operation is as follows:

Closing the start button No. 44 allows an electric current to flow from the secondary side of transformer 18, through the solenoid of multiple switch 33, through lines 43 and 40 to commutator brush 41 and then through line 32 to the opposite side of the secondary of transformer 18. When the solenoid of multiple switch 33 is energized, the three contacts, 45, 34 and 38 close with their respective contacts 47, 36' and 39. When contacts 38 and 39 are closed, a circuit is established from the secondary side of transformer 18 through the solenoid of multiple switch 33, through contacts 38, 39, through contact 42, and thence through line 40 to the opposite side of the secondary transformer 18 as outlined above. When contacts 34 and 36' are closed, a circuit is established from line 17b through line 35, through contacts 34, 36', through lamp 15, and is completed when it joins 17a. The lamp or signal 15 then indicates that the electrical portion of the system is in operation.

When contacts 45, 47 are closed, a circuit is established from the secondary of transformer 18 through line 48, through contacts 45, 47, and thence to suitable contacts on the motor operated valve 51, which causes this valve to open and permit the fuel gas to flow through pipe 5 to the mixing valve.

With the roaster in operation, a torch is held under the burners and the mixing valve is opened. After the burners are lighted, the peanuts are fed from the hopper 7 to the interior of the roaster, where the roasting operation commences.

The thermo-electric instrument is so arranged that in about 90 seconds before the completion of the roast, commutator 30' makes contact with brush 30, establishing a circuit from the secondary side of transformer 18 through line 26, through solenoid 24, through line 28, through line 32 to the opposite side of the secondary of transformer 18. Energizing this solenoid closes contacts 21, 24' and 20, allowing current to flow through the warning signal 13, which warns the operator that the roast is nearly completed.

When the final temperature is reached, the commutator 31' has been rotated by the expansion of the thermal fluid until it makes contact with commutator brush 31. This allows current to flow from the secondary side of transformer 18, through line 27, through solenoid 25, through line 29, through 31, and thence through line 32 to the opposite side of the secondary of transformer 18. Energizing solenoid 25 closes the contacts 23, 25', 22, which in turn causes signal 14 to operate. The roaster is then immediately discharged, thus completing the cycle.

Should the roaster be allowed to run empty with the burners lighted, the expansion of the thermal fluid would rotate commutator 41' until the circuit with commutator brush 41 is broken. This would disrupt the circuit which energizes the multiple switch 33, allowing the contacts to open. When in the open position as shown in Fig. 3, a circuit is then established from the secondary side of transformer 18, through line 48, through contacts 45 and 46, through line 49, to suitable contacts in the motor operated valve 51, which causes this valve to close, thus shutting off the gas supply and thereby preventing damage to the roaster from overheating. Pushing stop button 42 interrupts the same circuit and hence produces the same effect. The thermo-electric control device may be a simple thermometer as shown in Fig. 4, having relatively spaced electrical contacts provided in its wall which are successively closed by the expansion of the enclosed column of mercury. The preferred thermo-electric member is that shown in Fig. 3, of the commutator type, comprising a series of discs mounted for to and fro oscillatory motion about a common axis. Each disc includes a conductive section and a non-conductive portion engaged by a contact brush or finger riding thereon. The series of discs are oscillated to and fro in accordance with fluctuations of temperature under influence of the thermo-electric member 12.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A roasting apparatus, wherein a mass of peanuts or the like are tumbled in a heated rotary drum by being carried upwardly circumferentially of the drum beyond the angle of repose and allowed to descend by gravity through an inclined path disposed as a chord of their ascending path, including a rotary drum and a heater therefor characterized by a thermo-electric member positioned at the vortex of the mass of nuts and subject to fluctuations of temperature of the mass, a series of electrically operated signal devices exteriorly of the rotating drum, an electrical power circuit for supplying current to said signal devices, independently operated switches pertaining to the respective signal devices, and a series of switch operating electrical circuits successively closed by the thermo-electric member for energizing the signal devices in predetermined sequence in synchronism with the progress of the roasting operation.

2. A roasting apparatus, wherein a mass of peanuts or the like are tumbled in a heated rotary drum by being carried upwardly circumferential'y of the drum beyond the angle of repose and allowed to descend by gravity through an inclined path disposed as a chord of their ascending path, including a rotary drum and a heater therefor characterized by a thermally responsive member, a support therefor on which the thermally responsive member is stationarily positioned at substantially the vortex of the moving mass of material, and indicator means exteriorly of the drum controlled by the thermally responsive member.

3. The combination with a rotary heated cylinder, within which a mass of material operated upon is tumbled and thereby caused to flow through a circuitous path about a horizontal axis within the mass of material and a heater therefor, of a thermally responsive member stationarily positioned within the cylinder at a point of minimum disturbance within the mass and about which the material is circulated, and multiple signal means exteriorly of the cylinder controlled by fluctuation of the thermally responsive member to successively energize different signal means to indicate predetermined progress of heat treatment of the material.

4. The combination with a rotary heated drum within which a mass of material operated upon occupying only a segmental portion of the drum is tumbled through a circuitous path by being carried upward with the rotation of the drum beyond the angle of stability and allowed to descend along a chord of the occupied segment of the drum and a heater therefor, of a thermal responsive member located in an area of minimum disturbance substantially at the center of such circuitous travel motion of the material mass, and at a point of minimum hindrance thereto, a signal device controlled by the thermal responsive member indicative of approach to predetermined temperature, a second signal device controlled by said thermal responsive device in sequence with operation of the first signal and indicative of attainment of a predetermined temperature, and a fuel control device operative by the thermal responsive device in sequence with the signal devices for limiting the temperature of the drum to a predetermined maximum degree.

5. In a roasting apparatus of the character described, a rotary heated drum in which a mass of material operated upon is tumbled through a circuitous path within a segmental portion only of the drum by being carried upward through an arcuate path to a point beyond the angle of repose and allowed to descend through a chord of such segmental portion, a heater for said drum, an electrothermal member located at the center of minimum disturbance of said circulating mass, an electrical system controlled thereby including sequentially operated signal and temperature limit means including a signal indicative of approach to a predetermined roasting temperature, a signal indicative of attainment of a predetermined roasting temperature and a heating medium control device for said drum heater operative to limit the temperature generated thereby to a predetermined maximum degree, and a succession of contacts in said electrical system pertaining to the respective signals and to the temperature fuel control device closed in sequence by the thermally responsive member.

6. A roasting apparatus, wherein a mass of material is tumbled in a heated rotary drum by being carried upwardly circumferentially of the drum beyond the angle of repose and allowed to descend by gravity through an inclined path disposed as a chord of its ascending path, including a rotary drum and a heater therefor, characterized by a thermo-electric member positioned below the axis of the drum and extending into the mass of material at a point in a plane extending longitudinally of and passing through the axis of the drum and perpendicular to said path and subject to fluctuations of temperature of the mass, an electrically operated relay system responsive to said thermo-electric member, and signal devices actuated by said relay system indicating the progress of the roasting operation.

7. In a roasting apparatus, wherein a mass of material is tumbled in a heated rotary drum by being carried upwardly circumferentially of the drum beyond the angle of repose and allowed to descend by gravity through an inclined path disposed as a chord of its ascending path, including a rotary drum, characterized by a thermo-electric member positioned below the axis of the drum and extending into the mass of material at a point in a plane extending longitudinally of and passing through the axis of the drum and perpendicular to said path and subject to fluctuations of temperature of the mass, heater means for the drum, an electrically operated fuel control valve therefor, and an electrical circuit governed by the thermo-electric member for actuating the fuel control valve.

8. The combination with a rotary heated cylinder, within which a mass of material operated upon is carried upwardly circumferentially of the cylinder beyond the angle of repose and allowed to descend by gravity through an inclined path disposed as a chord of its ascending path, of a thermally responsive member about which the material is circulated stationarily positioned within the cylinder at a point below the axis of the cylinder and submerged in the mass of material at a point in a plane extending longitudinally of and passing through the axis of the cylinder and perpendicular to said inclined path, and heater means for the cylinder controlled by the thermally responsive member.

9. The herein described method including the steps of heating a mass of mobile material and simultaneously revolving the heated mass of mobile material in substantially concentric relation with a thermo-responsive device disposed substantially at the center of motion of the mass and automatically controlling the temperature of the revolving mass in accordance with the fluctuations of said thermo-responsive device.

10. The herein described method including the steps of heating a mass of mobile material and simultaneously revolving the heated mass of mobile material in substantially concentric relation with a thermo-responsive device disposed substantially at the vortex of the mass and progressively signaling exteriorly of the mass different successive thermal conditions occurring therein.

MAURICE D. WOODRUFF.